US012583598B1

(12) United States Patent
Bryant et al.

(10) Patent No.: US 12,583,598 B1
(45) Date of Patent: Mar. 24, 2026

(54) POWER DISTRIBUTION SYSTEM AND METHOD FOR AN AIRCRAFT

(71) Applicant: Textron eAviation Inc., Providence, RI (US)

(72) Inventors: Logan Bryant, Wichita, KS (US); Anthony Ly, Wichita, KS (US); Alec Mitchell, Wichita, KS (US); Michael Hull, Fort Worth, TX (US); James Davenport, Wichita, KS (US); Steven G. Hagerott, Wichita, KS (US); Jack Fries, Derby, KS (US)

(73) Assignee: Textron eAviation Inc., Providence, RI (US)

( * ) Notice: Subject to any disclaimer, the term of this patent is extended or adjusted under 35 U.S.C. 154(b) by 4 days.

(21) Appl. No.: 18/740,484

(22) Filed: Jun. 11, 2024

Related U.S. Application Data

(60) Provisional application No. 63/507,626, filed on Jun. 12, 2023.

(51) Int. Cl.
B60L 50/60 (2019.01)
B60L 3/00 (2019.01)
(Continued)

(52) U.S. Cl.
CPC .......... B64D 27/357 (2024.01); B60L 3/0046 (2013.01); B60L 3/0092 (2013.01); B60L 50/60 (2019.02); H01M 50/204 (2021.01); H01M 50/249 (2021.01); H02J 3/001 (2020.01); H02J 3/0073 (2020.01); H02J 9/068 (2020.01); B60L 2200/10 (2013.01); B64C 9/00 (2013.01); B64D 2221/00 (2013.01); H01M 2220/20 (2013.01)

(58) Field of Classification Search
CPC ...... B60L 3/0046; B60L 3/0092; B60L 50/50; B60L 50/51; B60L 50/52; B60L 50/60;

B60L 50/66; B60L 58/18; B60L 58/20; B60L 58/21; B60L 2200/10; B64D 27/34; B64D 27/357; B64D 2221/00; H02J 1/084; H02J 3/001; H02J 3/007; H02J 3/0073; H02J 7/0013; H02J 9/04; H02J 9/06; H02J 9/061; H02J 9/068
See application file for complete search history.

(56) References Cited

U.S. PATENT DOCUMENTS 9,611,049 B2    4/2017   Esteyne et al.
10,035,607 B2   7/2018   Wangemann et al.
(Continued)

FOREIGN PATENT DOCUMENTS

WO          2019232472 A1    12/2019

*Primary Examiner* — Levi Gannon
(74) *Attorney, Agent, or Firm* — Avek IP, LLC

(57) ABSTRACT

A power distribution system includes a first battery and first power distribution unit providing power to a first rotor assembly and a fourth rotor assembly, the first and fourth rotor assemblies are outer front rotor assemblies; a second battery and second power distribution unit providing power to a second rotor assembly, the second rotor assembly is an inboard front rotor assembly; a third battery and third power distribution unit providing power to a third rotor assembly, the third rotor assembly is another inboard front rotor assembly; and a fourth battery and fourth power distribution unit providing power to the first rotor assembly and the fourth rotor assembly; the first, second, third, and fourth power distribution units are implemented with consideration of possible failure modes of one or more of the first, second, third, and fourth batteries.

20 Claims, 5 Drawing Sheets

(51) Int. Cl.

| | |
|---|---|
| *B64D 27/35* | (2024.01) |
| *B64D 27/357* | (2024.01) |
| *H01M 50/204* | (2021.01) |
| *H01M 50/249* | (2021.01) |
| *H02J 3/001* | (2026.01) |
| *H02J 3/0073* | (2026.01) |
| *H02J 9/06* | (2006.01) |
| *B64C 9/00* | (2006.01) |

(56) References Cited

U.S. PATENT DOCUMENTS

| | | | | |
|---|---|---|---|---|
| 10,543,905 | B1 * | 1/2020 | Kwon | B64D 27/357 |
| 10,654,578 | B2 | 5/2020 | Armstrong et al. | |
| 10,974,836 | B2 | 4/2021 | Harwood et al. | |
| 12,006,048 | B2 * | 6/2024 | Bevirt | B64D 31/12 |
| 2006/0289696 | A1 * | 12/2006 | Hanlon | B64C 13/505 |
| | | | | 244/35 R |
| 2014/0097290 | A1 * | 4/2014 | Leng | B60L 58/12 |
| | | | | 244/6 |
| 2020/0010187 | A1 * | 1/2020 | Bevirt | B64C 29/0033 |
| 2020/0079520 | A1 * | 3/2020 | Demizu | B64D 27/357 |
| 2020/0283134 | A1 * | 9/2020 | Mores | B64U 10/13 |
| 2021/0229821 | A1 | 7/2021 | Alt et al. | |
| 2022/0258873 | A1 * | 8/2022 | Bernard | B64C 31/06 |
| 2022/0267016 | A1 * | 8/2022 | Lanzendoerfer | B64C 27/08 |
| 2022/0315214 | A1 * | 10/2022 | Mitani | B60L 3/0092 |
| 2022/0396364 | A1 * | 12/2022 | Wiegman | B64D 27/34 |
| 2024/0158093 | A1 * | 5/2024 | MacAfee | B64D 31/00 |
| 2025/0249791 | A1 * | 8/2025 | Nakamura | H01M 10/48 |

* cited by examiner

POWER DISTRIBUTION SYSTEM AND METHOD FOR AN AIRCRAFT

CROSS REFERENCE TO RELATED APPLICATIONS

This application claims the benefit of priority of U.S. Provisional Patent Application No. 63/507,626, filed Jun. 12, 2023, the disclosure of which is herein incorporated by reference in its entirety.

BACKGROUND

1. Field

Embodiments of the disclosure relate to flight control systems, and in particular to a flight control system with a power distribution system configured to manage multiple high voltage sources to provide continued safe flight and landing after a loss of one high voltage source.

2. Related Art

Flight control systems are known in the art and generally take into account potential failures. For example, U.S. Pat. No. 10,974,836 to Harwood et al. describes an electric propulsion system for an aircraft which may utilize a controller to re-route power in the event of a failure of a component of the aircraft. U.S. Pat. No. 9,611,049 to Esteyne et al. describes an electric propulsion system for an aircraft that includes multiple motors and multiple battery packs to provide power to the motors, wherein a backup converter is provided and connected to a secondary high-voltage electric circuit for use to power electrical elements in the event of a break in the primary power supply. U.S. Pat. No. 10,035,607 to Wangemann et al. describes an electric propulsion system for an aircraft that offers redundancy of power sources to aid in the event of a failure. U.S. Pat. No. 10,654,578 to Armstrong et al. describes an electric propulsion system for an aircraft that utilizes multiple networks of power supplies to aid in recovery during a failure. Lastly, U.S. Patent Application Publication No. 2021/0229821 to Alt et al. describes an electric propulsion system for an aircraft which utilizes a specific configuration of busses to aid in recovery after a failure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In embodiments, the disclosure relates to a power distribution system for an aircraft, the aircraft having a plurality of rotor assemblies and one or more flight control computers configured to provide operation of the plurality of rotor assemblies. The system includes four batteries, each providing power to one or more aircraft systems. A first battery with a first power distribution unit provides power to a first rotor assembly and a fourth rotor assembly of the plurality of rotor assemblies, the first rotor assembly and the fourth rotor assembly being outer front rotor assemblies of the aircraft. A second battery with a second power distribution unit provides power to a second rotor assembly of the plurality of rotor assemblies, the second rotor assembly is an inboard front rotor assembly. A third battery with a third power distribution unit provides power to a third rotor assembly of the plurality of rotor assemblies, the third rotor assembly is another inboard front rotor assembly. A fourth battery with a fourth power distribution unit provides power to the first rotor assembly and the fourth rotor assembly. The first, second, third, and fourth power distribution units are implemented with consideration of possible failure modes of any of the batteries and any of the power distribution units such that controlled flight is maintained despite failure of any one of the batteries or any one of the power distribution units.

In other embodiments, the present invention relates to a method of distributing power to aircraft systems of an aircraft, the aircraft having a plurality of rotor assemblies and one or more flight control computers configured to provide operation of the plurality of rotor assemblies. The method includes distributing power to a first rotor assembly and a fourth rotor assembly of the plurality of rotor assemblies from a first battery and a first power distribution unit, the first rotor assembly and the fourth rotor assembly are outer front rotor assemblies of the aircraft. The method additionally includes distributing power to a second rotor assembly of the plurality of rotor assemblies from a second battery and a second power distribution unit, the second rotor assembly is an inboard front rotor assembly. Yet further, the method includes distributing power to a third rotor assembly of the plurality of rotor assemblies from a third battery with a third power distribution unit, the third rotor assembly is another inboard front rotor assembly, and distributing power to the first rotor assembly and the fourth rotor assembly from a fourth battery with a fourth power distribution unit. The first, second, third, and fourth power distribution units are implemented with consideration of possible failure modes of any of the batteries and any of the power distribution units such that controlled flight is maintained despite failure of any one of the batteries or any one of the power distribution units.

BRIEF DESCRIPTION OF THE DRAWING FIGURES

Embodiments of the invention are described in detail below with reference to the attached drawing figures, wherein.

Figure 1:
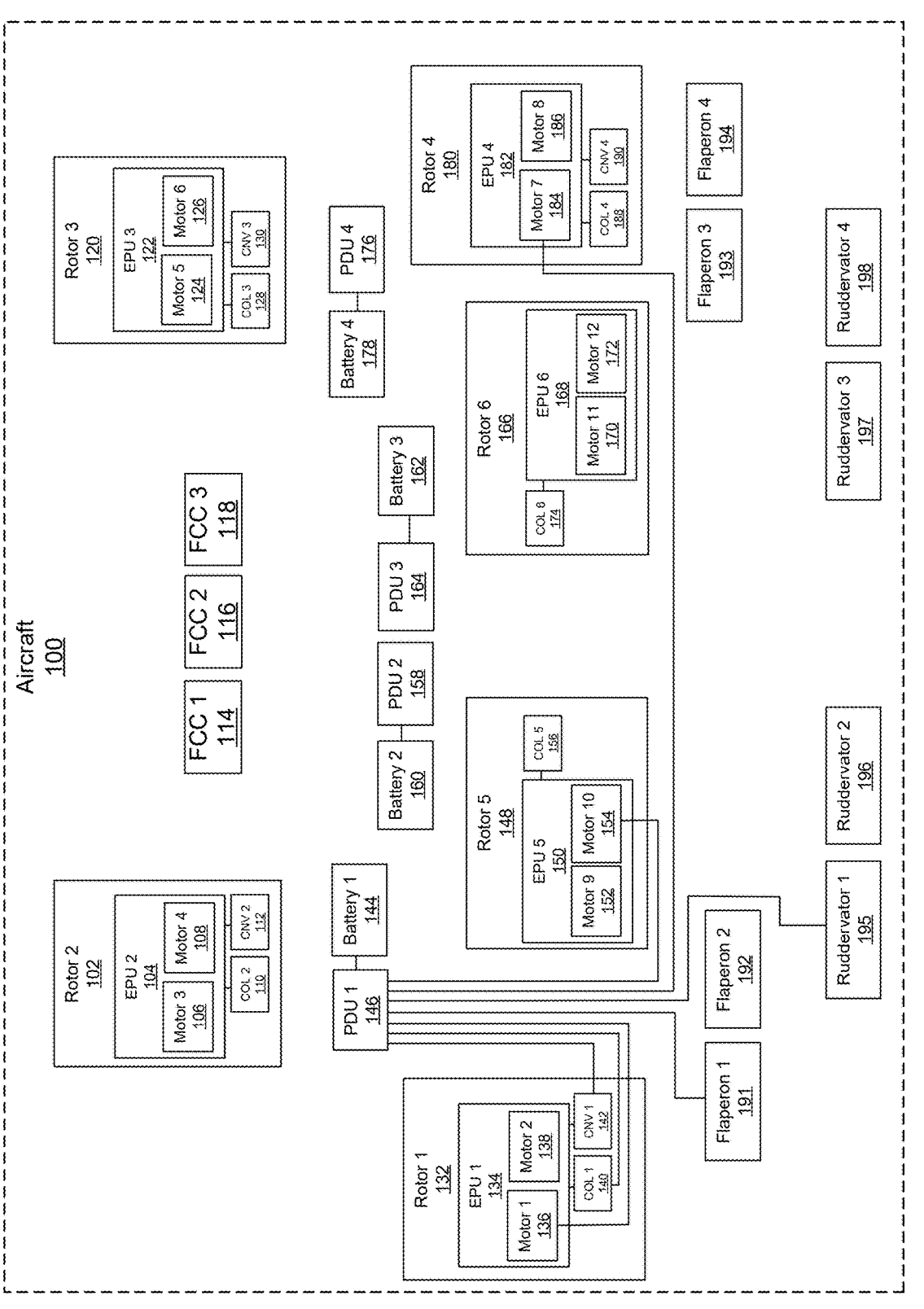
FIG. 1 is a first block diagram of a high voltage power distribution system of the present invention for an aircraft showing high voltage power distribution from a first battery and first power distribution unit to a plurality of aircraft systems.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

The aircraft industry has adapted to utilize a plurality of power sources, including fossil fuels as well as electrical energy. In electrical aircraft systems, an aircraft control system operates with a propulsion system, drawing power from one or more electrical energy storage systems that include one or more batteries. Power drawn from the electrical energy storage systems is used by the propulsion systems to generate lift and thrust for the aircraft. For example, an electrical aircraft may include a plurality of flight control computers that operate via autopilot functions and via user interfaces, including pedals, control wheels, sidesticks, levers, touchscreens, knobs, etc. for receiving user or computer commands to operate the aircraft. Based on these commands, power from one or more batteries are used by effectors, such as rotor assemblies and flight control surfaces (e.g., flaperons and ruddervators), to provide aircraft control and flight operations.

The electrical energy storage systems, as well as other aircraft components (rotors, motors, flaperons, ruddervators, etc.) can individually, or in combination, experience failures. Such failures can result in devastating conditions during flight, and accordingly, it is necessary for the aircraft manufacturers to implement flight controls and power distribution systems such that single failures meet a minimum acceptable control (MAC) standard, and the flight controls and power distribution systems are implemented such that the aircraft may be safely landed in the event of a failure.

The present invention provides for an improvement to implementing flight controls in the event of a failure in an electrical aircraft. The present invention includes a power distribution system that distributes high voltage (HV) power to the various aircraft systems in a configuration that allows for controllability and power for landing after loss of one of the HV power sources, i.e. batteries. Although the present invention is not limited to a specific voltage range associated with each power source, in at least some embodiments the high voltage falls within a range between 300 VDC and 7400 VDC. The HV distribution system of the present invention considers other potential failures, such as a rotor failure, a single electric propulsion unit (EPU) failure, a flaperon or ruddervator failure, a limit in HV power, and an actuator failure. The novelty of the present invention lies in the arrangement of the distribution of high voltage power from a plurality of batteries, each with an associated power distribution unit, to the plurality of aircraft systems. Specifically, the present invention includes each inboard front rotor of an aircraft having a single high voltage power source, and each outer front rotor having dual high voltage power sources. This arrangement, in combination with predefined failure modes, allows for continued control and power in the event of a battery failure during both forward flight and vertical takeoff and landing (VTOL) operations.

Figure 2:
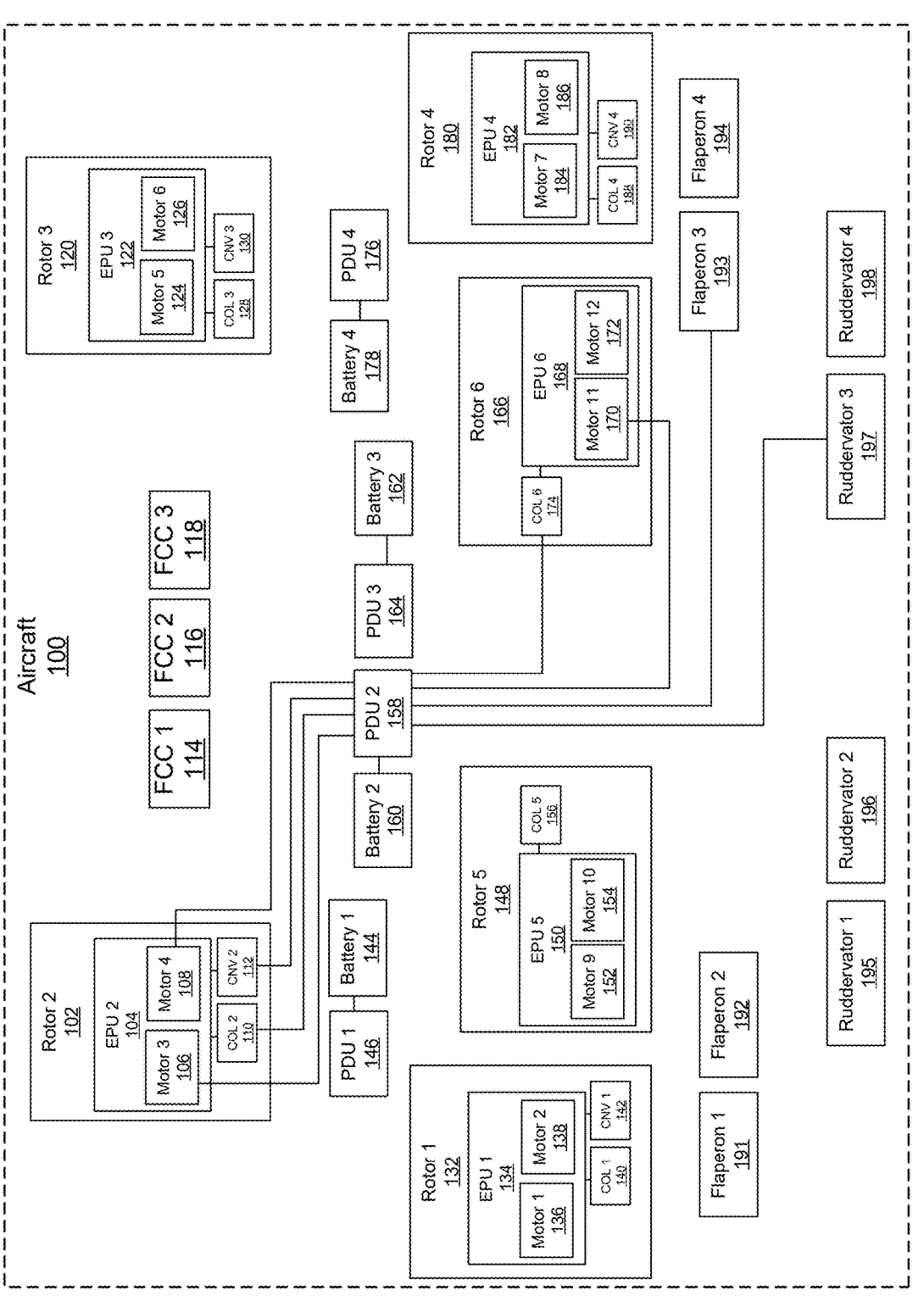
FIG. 2 is a second block diagram of the high voltage power distribution system of the present invention for the aircraft showing high voltage power distribution from a second battery and second power distribution unit to a plurality of aircraft systems.
Figure 3:
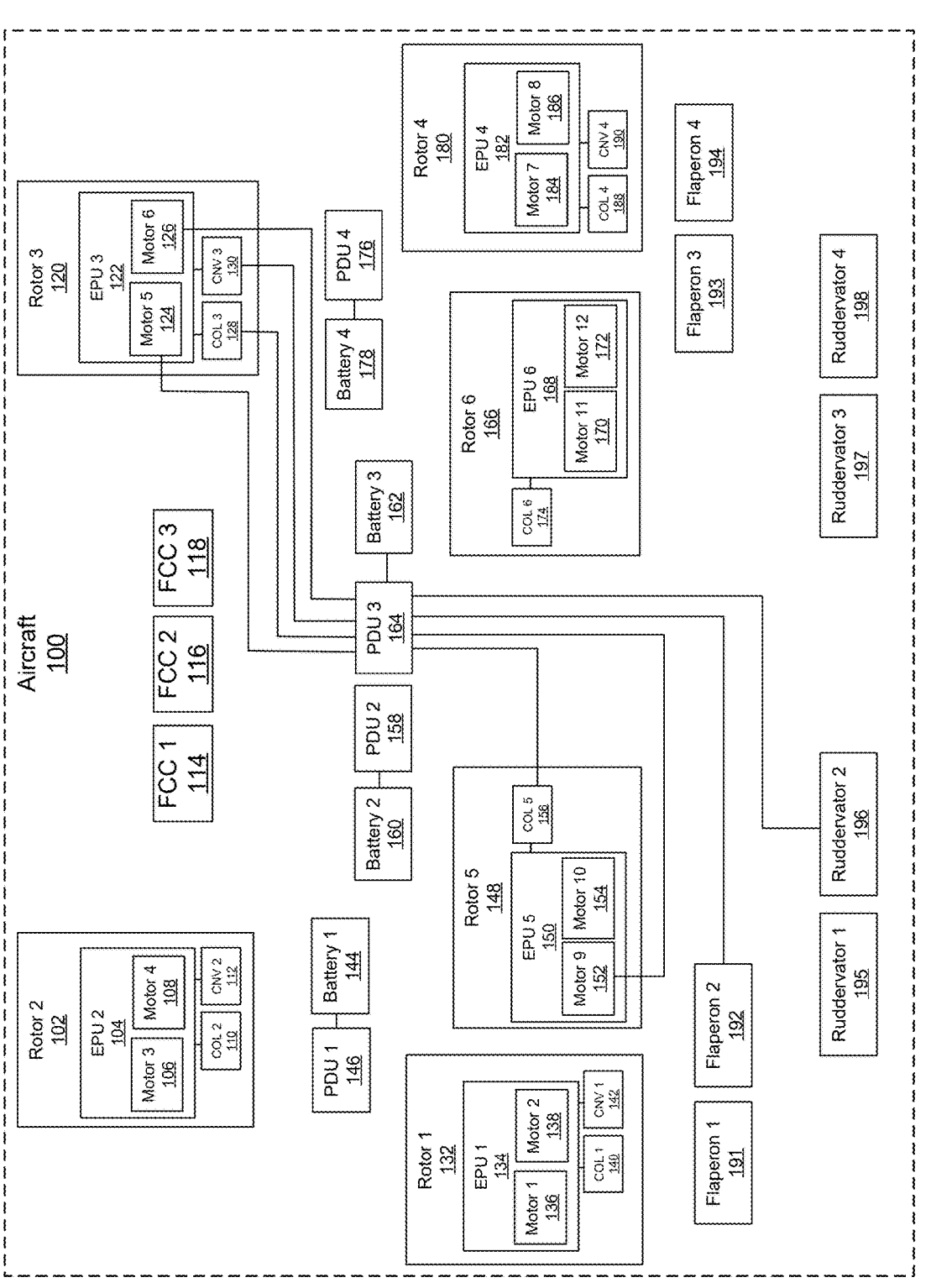
FIG. 3 is a third block diagram of the high voltage power distribution system of the present invention for the aircraft showing high voltage power distribution from a third battery and third power distribution unit to a plurality of aircraft systems.
Figure 4:
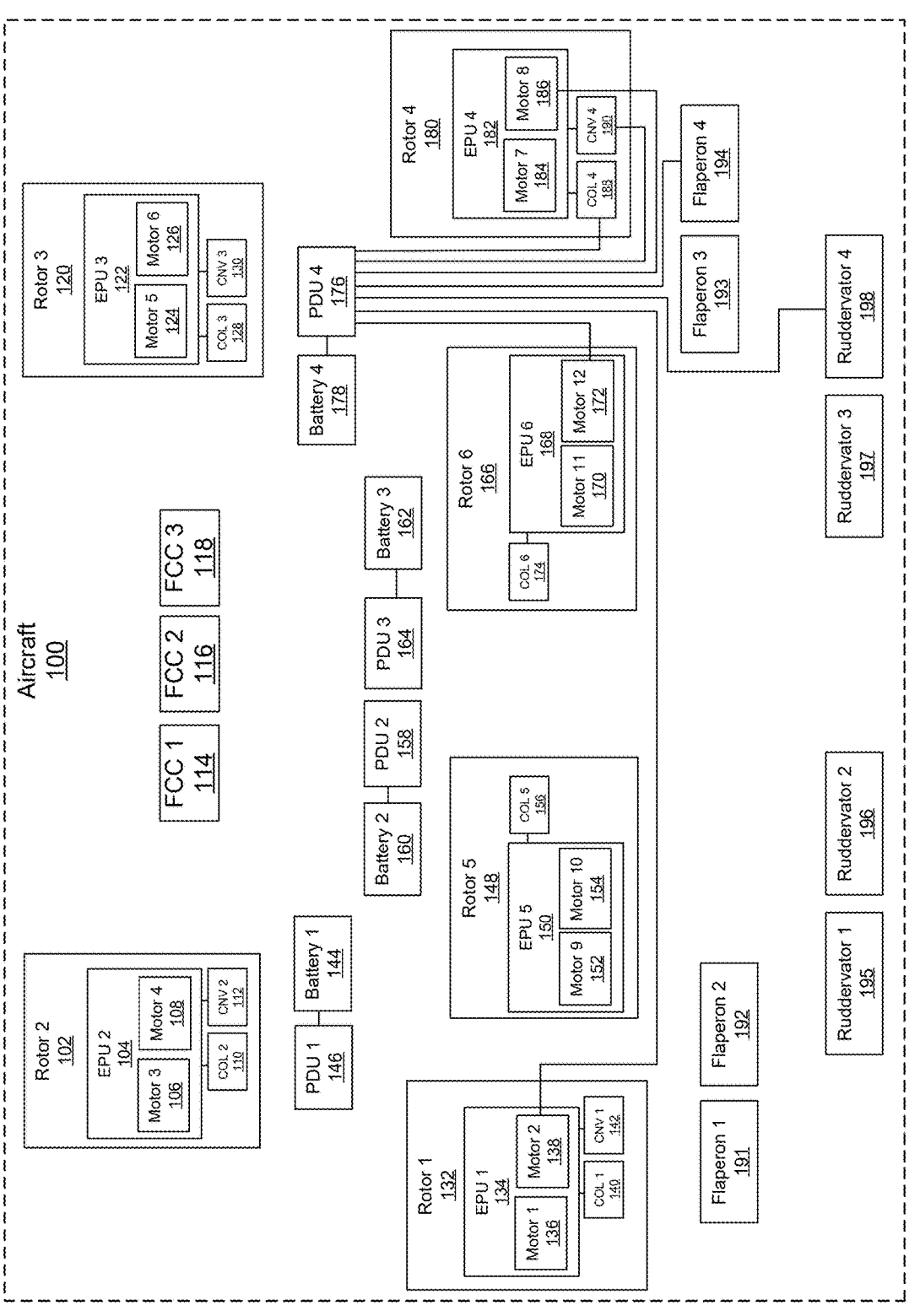
FIG. 4 is a fourth block diagram of the high voltage power distribution system of the present invention for the aircraft showing high voltage power distribution from a fourth battery and fourth power distribution unit to a plurality of aircraft systems.

FIGS. 1 through 4 depict block diagrams of a high voltage (HV) power distribution system of an aircraft 100. Specifically, each figure represents the HV power distribution associated with one of four batteries 144, 160, 162, 178 of the present invention. In other words, FIG. 1 shows the HV power distribution associated with a first battery 144 and first power distribution unit (PDU) 146. FIG. 2 shows the HV power distribution associated with a second battery 160 and second PDU 158. FIG. 3 shows the HV power distribution associated with a third battery 162 and third PDU 164. FIG. 4 shows the HV power distribution associated with a fourth battery 178 and fourth PDU 176. The overall HV power distribution system of the present invention is the combination of FIGS. 1-4.

The HV power distribution system is implemented in an aircraft 100 represented by the dashed exterior rectangle. Those skilled in the art will appreciate that the aircraft 100 may vary in style, model, and operational components. One or more flight control computers (FCCs) 114, 116, 118 will provide for operation of the aircraft 100 through any number and combination of interfaces, hardware, and software components. Having more than one FCC provides redundancy to account for potential FCC failures or malfunctions. In the depicted configuration, having three FCCs 114, 116, 118, a voting algorithm may be employed to vote out a single FCC that malfunctions or produces faulty data.

In embodiments, the aircraft 100 is a six-rotor assembly 132, 102, 120, 180, 148, 166 aircraft, again including all necessary functional components for operation of the rotor assemblies. The aircraft 100, in embodiments, includes four batteries 144, 160, 162, 178, each with an associated PDU 146, 158, 164, 178, which provide for HV power distribution among the rotor assemblies and other aircraft systems (i.e. flaperons and ruddervators). Each PDU is configured to handle the following operations: (1) power distribution; (2) voltage and current monitoring; (3) short circuit protection; and (4) FCC communication. The PDU for each battery can communicate with one or more of the FCCs to determine when to disconnect or connect a load. In addition, each PDU can utilize an internal relay driver to signal failure or loss of high voltage. The power architecture, namely four batteries each with an associated PDU, can experience full and partial failures. For example, a partial battery failure will result in loss of energy capacity for the failed battery. A PDU failure or battery failure can result in loss of all the motors tied to that battery. The present invention provides for continued power and control in these conditions.

Each battery and associated PDU is intentionally coupled to a plurality of the aircraft systems, namely one or more rotor assemblies, one or more flaperons, and one or more ruddervators, such that the particular coupling allows for continued safe flight and landing of the aircraft after failure of one high voltage source. Each battery of the present invention may power two motors or three motors. The system takes into account a plurality of driving factors, including (1) the interaction between motor and actuator failures; (2) the desirability for center-of-gravity (C.G.) opposed pair symmetry for hover mode failures; (3) the desirability for left/right symmetry for flight mode failures; and (4) the drawing of balanced power in flight mode and hover mode between four sources.

As shown, each rotor assembly operates with an electric propulsion unit (EPU) arranged as a dual motor with a gearbox, along with a single motor and single loadpath collective linear actuator (COL). The first, second, third, and fourth rotor assemblies 132, 102, 120, 180 also include a single motor and single loadpath conversion rotary actuator (CNV). In other words, the aircraft 100 includes first through twelfth motors, first through sixth COLs, and first through fourth CNVs. The COL is used to adjust a propeller blade angle of its respective rotor; the CNV is used on the first through fourth rotor assemblies 132, 102, 120, 180 to convert the orientation of its respective rotor from upright to forward facing for switching between VTOL and forward flight.

Aircraft 100, in embodiments, includes first, second, third, and fourth flaperons 191, 192, 193, 194, and first, second, third, and fourth ruddervators 195, 196, 197, 198. Flaperons are control surfaces on the wings configured to combine the function of traditional flaps and ailerons; ruddervators are control surfaces configured to combine the function of a traditional rudder and elevators. Those skilled in the art will appreciate that the number of flaperons and ruddervators may vary in embodiments, which may have implications for the number and arrangement of HV power sources.

As shown in FIG. 1, the first battery 144 and first PDU 146 provide HV power to a first EPU 134 for operation of the first rotor assembly 132. Specifically, the HV power is directed to the first motor 136, the first COL 140, and the first CNV 142 all associated with the first rotor assembly 132. The first battery 144 and first PDU 146 further provide HV power to a fourth EPU 182 for operation of the fourth rotor assembly 180, and specifically to the seventh motor 184. In other words, the first battery 144 and PDU 146 are coupled to motors 136, 184 of the first and fourth rotor assemblies 132, 180 respectively. The first and fourth rotor assemblies are specifically outer front rotor assemblies.

In embodiments, the first battery 144 and PDU 146 also provide HV power to a fifth EPU 150 for operation of the fifth rotor assembly 148, and specifically to the tenth motor 154 as part of the fifth rotor assembly 148. The first battery 144 and PDU 146 further provide HV power to the first flaperon 191 and the first ruddervator 195.

As shown in FIG. 2, the second battery 160 and second PDU 158 provide HV power to a second EPU 104 for operation of the second rotor assembly 102. Specifically, the HV power is directed to the third motor 106, the fourth motor 108, the second COL 110, and the second CNV 112 all as associated with the second rotor assembly 102. Accordingly, the second battery 160 and PDU 158 are the sole source of HV power for the second rotor assembly 102. The second rotor assembly 102 is an inboard front rotor assembly.

In embodiments, the second battery 160 and PDU 158 further provide HV power to the EPU 168 of the sixth rotor assembly 166, and specifically the eleventh motor 170 and sixth COL 174 as part of the sixth rotor assembly 166. The second battery 160 and PDU 158 further provide HV power to the third flaperon 193 and the third ruddervator 197.

As shown in FIG. 3, the third battery 162 and third PDU 164 provide HV power to a third EPU 122 for operation of the third rotor assembly 120. Specifically, the HV power is directed to the fifth motor 124, the sixth motor 126, the third COL 128, and the third CNV 130 all as associated with the third rotor assembly 120. Accordingly, the third battery 162 and PDU 164 are the sole source of HV power for the third rotor assembly 120. The third rotor assembly 120 is also an inboard front rotor assembly.

In embodiments, the third battery 162 and PDU 164 further provide HV power to a fifth EPU 150 for operation of the fifth rotor assembly 148, and specifically to the nineth motor 152 and fifth COL 156 as part of the fifth assembly 148. The third battery 162 and PDU 164 further provide HV power to the second flaperon 192 and the second ruddervator 196.

As shown in FIG. 4, the fourth battery 178 and fourth PDU 176 provide HV power to a fourth EPU 182 for operation of the fourth rotor assembly 180. Specifically, the HV power is directed to the eighth motor 186, the fourth COL 188, and the fourth CNV 190 all as associated with the fourth rotor assembly 180. The fourth battery 178 and PDU 176 further provide HV power to the first EPU 134 for operation of the first rotor assembly 132, and specifically to the second motor 138. In other words, the fourth battery 178 and PDU 176 are coupled to motors 186, 138 of the fourth and first rotor assemblies 180, 132 respectively.

In embodiments, the fourth battery 178 and PDU 176 also provide HV power to the sixth EPU 168 for operation of the sixth rotor assembly 166, and specifically to the twelfth motor 172 as part of the sixth rotor assembly 166. The fourth battery 178 and PDU 176 further provide HV power to the fourth flaperon 194 and the fourth ruddervator 198.

Figure 5:
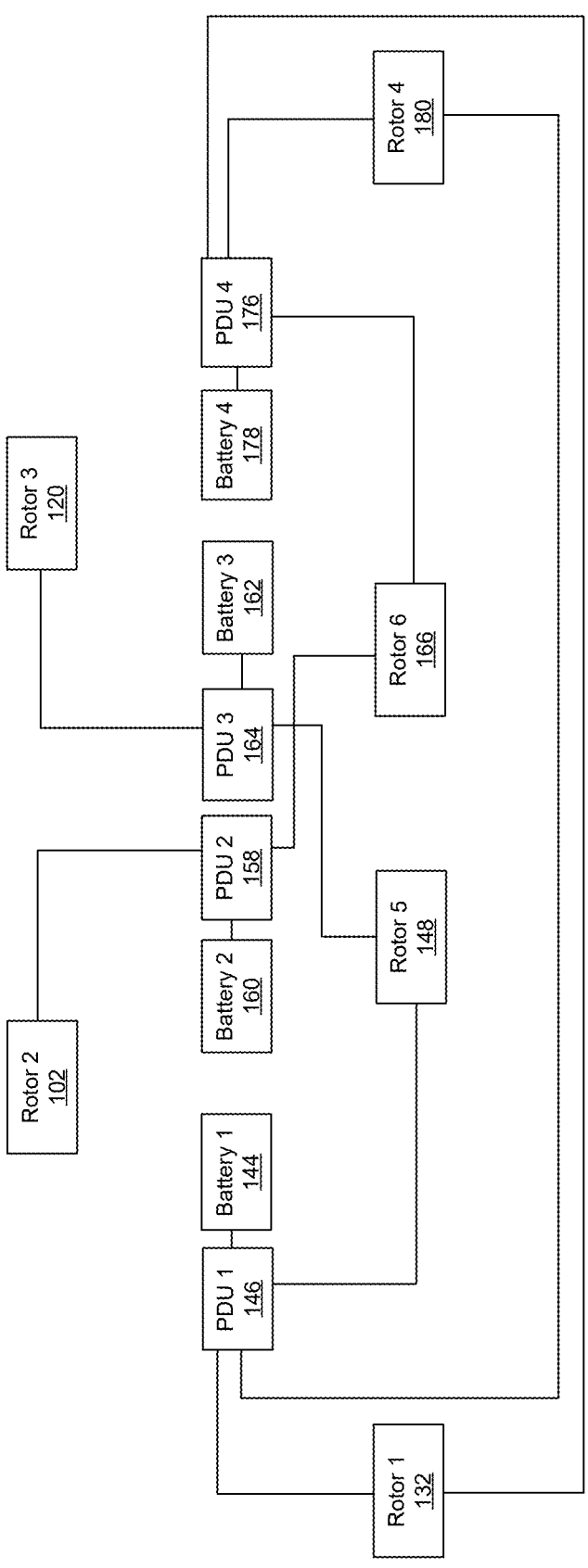
FIG. 5 is a simplified schematic showing high voltage power distribution from the four power distribution units of FIGS. 1 through 4 to six rotor assemblies in accordance with the present invention.

In FIG. 5, a simplified diagram depicts the high voltage power distribution discussed above. Specifically, this diagram shows the first rotor assembly 132 and the fourth rotor assembly 180 receiving HV power from two sources, namely the first battery 144 and the fourth battery 178. Similarly, the fifth rotor assembly 148 receives HV power from two sources, namely the first battery 144 and the third battery 162. The sixth rotor assembly 166 also receives HV power from two sources, namely the second battery 160 and the fourth battery 178.

Further shown, the inboard front rotor assemblies, specifically the second and third rotor assemblies 102, 120 have single HV sources, namely the second and third batteries 160, 162 respectively.

The specified arrangement and architecture of the HV power distribution discussed above provides for use of a low number of batteries, i.e. four, with sufficient redundancy to maintain MAC for predetermined most likely failures associated with one or more HV sources, rotors, motors, flaperons, ruddervators, COLs, and CNVs.

In embodiments, the HV power distribution system provides for allowed and disallowed combinations. The allowed combinations have a higher probability of occurring than the disallowed combinations and are combinations which meet MAC. Specifically, some contemplated allowed combinations are: (1) loss of two C.G. opposed rotors; (2) degradation of three rotors if two of the three are C.G. opposed; (3) loss of one flaperon; and (4) loss of one ruddervator. Alternatively, some contemplated disallowed combinations are (1) loss of three motors across the second and third rotor assemblies 102, 120; (2) loss of three motors across the fifth and sixth rotor assemblies 148, 166; (3) loss of the COL on any two non C.G. opposed rotor assemblies; and (4) loss of two rotor assemblies (both motors and COL) across the first, second, third, and fourth rotor assemblies 132, 102, 120, 180. Those skilled in the art will appreciate that the HV power distribution system of the present invention accounts for loss of any one PDU/Battery without resulting in a disallowed combination.

Further, in embodiments, the HV power distribution system, along with the plurality of FCCs, is configured with consideration for the effects of flight control failures. In embodiments, in the event of a loss of control of a collective, the collective is held in position and the associated rotor is disabled if the flight mode changes. In the event of a loss of one rotor, the thrust from the C.G. opposed rotor would be reduced. In the event of a loss of conversion: (1) if the aircraft is in forward flight, the associated rotor and C.G. opposed rotor are lost for landing; and (2) the aircraft would only land in hover mode, but can perform a rolling landing in hover mode if needed.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A power distribution system for an aircraft, comprising:
the aircraft having a plurality of rotor assemblies and one or more flight control computers configured to provide operation of the plurality of rotor assemblies;
a first battery with a first power distribution unit, the first battery and the first power distribution unit providing power to a first rotor assembly and a fourth rotor assembly of the plurality of rotor assemblies, the first rotor assembly and the fourth rotor assembly are outer front rotor assemblies of the aircraft;
a second battery with a second power distribution unit, the second battery and the second power distribution unit providing power to a second rotor assembly of the plurality of rotor assemblies, the second rotor assembly is an inboard front rotor assembly;
a third battery with a third power distribution unit, the third battery and the third power distribution unit providing power to a third rotor assembly of the plurality of rotor assemblies, the third rotor assembly is another inboard front rotor assembly; and
a fourth battery with a fourth power distribution unit, the fourth battery and the fourth power distribution unit providing power to the first rotor assembly and the fourth rotor assembly;
wherein the second rotor assembly only receives power from the second battery and the third rotor assembly only receives power from the third battery; and
wherein the first, second, third, and fourth power distribution units are implemented with consideration of possible failure modes of any of the batteries and any of the power distribution units such that controlled flight is maintained despite failure of any one of the batteries or any one of the power distribution units, controlled flight being maintained without implementation of additional power units outside of the first, second, third, and fourth batteries.

2. The system of claim 1, wherein the first battery with the first power distribution unit and the third battery with the third power distribution unit each independently provide power to a fifth rotor assembly of the plurality of rotor assemblies, the fifth rotor assembly being positioned on a side of the aircraft opposite of the third rotor assembly.

3. The system of claim 2, wherein the second battery with the second power distribution unit and the fourth battery with the fourth power distribution unit each independently provide power to a sixth rotor assembly of the plurality of rotor assemblies, the sixth rotor assembly being positioned on a side of the aircraft opposite of the second rotor assembly.

4. The system of claim 3, wherein the first battery and the fourth battery provide power to exactly three rotor assemblies and the second battery and third battery provide power to exactly two rotor assemblies and wherein the first battery, second battery, third battery, and fourth battery are the only batteries providing power to the first, second, third, fourth, fifth, and sixth rotary assemblies.

5. The system of claim 4, wherein:
a failure of the first battery does not result in loss of the first, second, third, fourth, fifth, or sixth rotor assemblies;
a failure of the second battery does not result in loss of the first, third, fourth, fifth, or sixth rotor assemblies and does result in loss of the second rotor assembly;
a failure of the third battery does not result in loss of the first, second, fourth, fifth, or sixth rotor assemblies and does result in loss of the third rotor assembly; and
a failure of the fourth battery does not result in loss of the first, second, third, fourth, fifth, or sixth rotor assemblies;
wherein a loss of the second rotor assembly or the third rotor assembly does not cause a loss of minimum acceptable control of the aircraft.

6. The system of claim 1, further comprising four flaperons as part of the aircraft, wherein a first flaperon receives power from the first battery and the first power distribution unit, a second flaperon receives power from the third battery and third power distribution unit, a third flaperon receives power from the second battery and the second power distribution unit, and a fourth flaperon receives power from the fourth battery and the fourth power distribution unit.

7. The system of claim 1, further comprising four ruddervators as part of the aircraft, wherein a first ruddervator receives power from the first battery and the first power distribution unit, a second ruddervator receives power from the third battery and third power distribution unit, a third ruddervator receives power from the second battery and the second power distribution unit, and a fourth ruddervator receives power from the fourth battery and the fourth power distribution unit.

8. The system of claim 1, wherein the first rotor assembly further comprises:
a first motor receiving power from the first battery and the first power distribution unit;
a second motor receiving power from the fourth battery and the fourth power distribution unit;
a first single motor and single loadpath collective linear actuator receiving power from the first battery and the first power distribution unit; and

a first single motor and single loadpath conversion rotary actuator receiving power from the first battery and the first power distribution unit.

9. The system of claim 8, wherein the second rotor assembly further comprises:

a third motor receiving power from the second battery and the second power distribution unit;

a fourth motor receiving power from the second battery and the second power distribution unit;

a second single motor and single loadpath collective linear actuator receiving power from the second battery and the second power distribution unit; and a second single motor and single loadpath conversion rotary actuator receiving power from the second battery and the second power distribution unit.

10. The system of claim 9, wherein the third rotor assembly further comprises:

a fifth motor receiving power from the third battery and the third power distribution unit;

a sixth motor receiving power from the third battery and the third power distribution unit;

a third single motor and single loadpath collective linear actuator receiving power from the third battery and the third power distribution unit; and a third single motor and single loadpath conversion rotary actuator receiving power from the third battery and the third power distribution unit.

11. The system of claim 10, wherein the fourth rotor assembly further comprises:

a seventh motor receiving power from the first battery and the first power distribution unit;

an eighth motor receiving power from the fourth battery and the fourth power distribution unit;

a fourth single motor and single loadpath collective linear actuator receiving power from the fourth battery and the fourth power distribution unit; and a fourth single motor and single loadpath conversion rotary actuator receiving power from the fourth battery and the fourth power distribution unit.

12. The system of claim 1, further comprising:

the second rotor assembly is a dual motor assembly and further comprises:

a first motor receiving power from the second battery and the second power distribution unit;

a second motor receiving power from the second battery and the second power distribution unit;

a single motor and single loadpath collective linear actuator receiving power from the second battery and the second power distribution unit; and a single motor and single loadpath conversion rotary actuator receiving power from the second battery and the second power distribution unit; and the third rotor assembly is another dual motor assembly and further comprises:

a third motor receiving power from the third battery and the third power distribution unit;

a fourth motor receiving power from the third battery and the third power distribution unit;

a second single motor and single loadpath collective linear actuator receiving power from the third battery and the third power distribution unit; and a second single motor and single loadpath conversion rotary actuator receiving power from the third battery and the third power distribution unit.

13. A method of distributing power to aircraft systems of an aircraft, the aircraft having a plurality of rotor assemblies and one or more flight control computers configured to provide operation of the plurality of rotor assemblies, the method comprising:

distributing power to a first rotor assembly and a fourth rotor assembly of the plurality of rotor assemblies from a first battery and a first power distribution unit, the first rotor assembly and the fourth rotor assembly are outer front rotor assemblies of the aircraft;

distributing power to a second rotor assembly of the plurality of rotor assemblies from a second battery and a second power distribution unit, the second rotor assembly is an inboard front rotor assembly;

distributing power to a third rotor assembly of the plurality of rotor assemblies from a third battery with a third power distribution unit, the third rotor assembly is another inboard front rotor assembly; and distributing power to the first rotor assembly and the fourth rotor assembly from a fourth battery with a fourth power distribution unit;

wherein the second rotor assembly only receives power from the second battery and the third rotor assembly only receives power from the third battery; and wherein the first, second, third, and fourth power distribution units are implemented with consideration of possible failure modes of any of the batteries and any of the power distribution units such that controlled flight is maintained despite failure of any one of the batteries or any one of the power distribution units, controlled flight being maintained without implementation of additional power units outside of the first, second, third, and fourth batteries.

14. The method of claim 13, further comprising distributing power to a fifth rotor assembly of the plurality of rotor assemblies independently from each of the first battery with the first power distribution unit and the third battery with the third power distribution unit, the fifth rotor assembly being positioned on a side of the aircraft opposite of the third rotor assembly.

15. The method of claim 14, further comprising distributing power to a sixth rotor assembly of the plurality of rotor assemblies independently from each of the second battery with the second power distribution unit and the fourth battery with the fourth power distribution unit, the sixth rotor assembly being positioned on a side of the aircraft opposite of the second rotor assembly.

16. The method of claim 13, further comprising:

wherein distributing power to the first rotor assembly from the first battery and the first power distribution unit comprises distributing power to a first motor of a pair of motors, to a single motor and single loadpath collective linear actuator, and to a single motor and single loadpath conversion rotary actuator; and wherein distributing power to the first rotor assembly from the fourth battery and the fourth power distribution unit comprises distributing power to a second motor of the pair of motors.

17. The method of claim 13, wherein distributing power to the second rotor assembly from the second battery and the second power distribution unit further comprises distributing power to a first motor, a second motor, a single motor and single loadpath collective linear actuator, and a single motor and single loadpath conversion rotary actuator, all as part of the second rotor assembly; and wherein distributing power to the third rotor assembly from the third battery and the third power distribution unit further comprises distributing power to a third motor, a fourth motor, a second single motor and single loadpath collective linear actuator, and a second single motor and single loadpath conversion rotary actuator, all as part of the third rotor assembly.

18. The method of claim 13, further comprising:

wherein distributing power to the fourth rotor assembly from the fourth battery and the fourth power distribution unit comprises distributing power to a first motor of a pair of motors, a single motor and single loadpath collective linear actuator, and a single motor and single loadpath conversion rotary actuator; and wherein distributing power to the fourth rotor assembly from the first battery and the first power distribution unit comprises distributing power to a second motor of the pair of motors.

19. The method of claim 13, further comprising:

distributing power to a first flaperon from the first battery through the first power distribution unit;

distributing power to a second flaperon from the third battery through third power distribution unit;

distributing power to a third flaperon from the second battery through the second power distribution unit;

distributing power to a fourth flaperon from the fourth battery through the fourth power distribution unit;

distributing power to a first ruddervator from the first battery through the first power distribution unit;

distributing power to a second ruddervator from the third battery through the third power distribution unit;

distributing power to a third ruddervator from the second battery through the second power distribution unit; and distributing power to a fourth ruddervator from the fourth battery through the fourth power distribution unit.

20. A power distribution system for an aircraft, comprising:

the aircraft having six dual motor rotor assemblies and one or more flight control computers configured to provide operation of the six dual motor rotor assemblies;

a plurality of batteries providing power to the six dual motor rotor assemblies, the plurality of batteries consisting of:

a first battery providing power to a first rotor assembly, a fourth rotor assembly, and a fifth rotor assembly, the first rotor assembly being a left outer front rotor assembly, the fourth rotor assembly being a right outer front rotor assembly, and the fifth rotor assembly being a left side rotor assembly;

a second battery providing power to a second rotor assembly and a sixth rotor assembly, the second rotor assembly being a left inboard front rotor assembly and the sixth rotor assembly being a right side rotor assembly;

a third battery providing power to a third rotor assembly and the fifth rotor assembly, the third rotor assembly being a right inboard front rotor assembly; and a fourth battery providing power to the first rotor assembly, the fourth rotor assembly, and the sixth rotor assembly;

wherein the second rotor assembly only receives power from the second battery and the third rotor assembly only receives power from the third battery; and wherein the plurality of batteries are implemented with consideration of possible failure modes of any of the batteries such that controlled flight is maintained despite failure of any one of the batteries, controlled flight being maintained without implementation of additional power units outside of the plurality of batteries.

\* \* \* \* \*